3,002,978
GLYCERYL PYRROLIDONE CARBOXYLATES
Gustave Marie Joseph Bocher, 67 Blvd. Raspail, Paris, France
No Drawing. Filed May 5, 1959, Ser. No. 810,984
Claims priority, application France May 6, 1958
4 Claims. (Cl. 260—326.3)

It is well known that glutamic acid enters into the metabolism of the tissue cell especially in biochemical reactions of the brain cell. Glutamic acid has been shown to improve mental functioning and is considered to be an essential metabolite for brain tissue. However, an outstanding limitation of glutamic acid is its well known inability to traverse the blood-brain barrier so that administered glutamic acid requires some intermediate modification in order to permit it to exert its beneficial effect. This intermediary metabolism (the mechanism of which is at present unknown) necessitates the administration of large doses of glutamic acid. In large doses, glutamic acid has a disagreeable taste which results in nausea and consequently requires special means to mask it, with only variable success.

Through the use of the products of the present invention, which are capable of being utilized by the body in a manner essentially as is glutamic acid, the disagreeable limiting aspects of glutamic acid therapy are avoided, while the full beneficial effects are retained. Furthermore, it should be noted that the glyceryl ester of pyrrolidone carboxylate has, in addition, a number of other properties which are distinctive, novel and different from both glutamic acid and pyrrolidone carboxylic acid, which make our compounds superior, novel as well as unique therapeutic agents.

Thus, it has been shown experimentally that:

(1) Glyceryl pyrrolidone carboxylate confers upon the nerve cells a complete resistance to intoxication by either ammonia or potassium ions.

(2) Glyceryl pyrrolidone carboxylate provides protection to the liver against the hapato-toxic effects of alcohol.

(3) Glyceryl pyrrolidone carboxylate has a demonstrable psychic-energizing effect.

(4) Glyceryl pyrrolidone carboxylate has a demonstrable intellectual psychotonic effect.

(5) Glyceryl pyrrolidone carboxylate has a demonstrable tranquilizing effect which is free of hypnotic side-effects.

In addition, toxicologic study in animals has demonstrated that glyceryl pyrrolidone carboxylate is completely free from both chronic and acute systemic toxic manifestations.

The above properties are distinct and different from those usually associated with tranquilizers, hypnotics, psychic-energizers or glutamic acid and its salts.

Glyceryl pyrrolidone carboxylate is free of the bitter taste characteristic associated with pyrrolidone carboxylic acid, its salts and glutamic acid. It is readily absorbed and may be prescribed over a wide dosage range in large amounts, with safety.

Pyrrolidone carboxylate glyceryl ester may be prepared from glutamic acid and glycerine, which are reacted in the proportion of one molecule of glutamic acid to three molecules of glycerine, with the aid of heat. The mixture is heated to a temperature of at least 150° C., in an inert atmosphere of carbon dioxide and is followed by glycerine esterification of the pyrrolidone carboxylic acid formed. The reaction is complete when the pH of the mixture is approximately neutral (pH of 6 to 8).

While the monopyrrolidone carboxylate glyceryl ester is the predominant compound obtained through this method of preparation, the di- and tri-glyceride esters may also be formed in the course of the reaction. This is of little consequence, however, since the mono-, di- and tri-glyceride derivatives all behave in an identical clinical manner as they are hydrolyzed into their identical components (pyrrolidone carboxylic acid and glycerin which at pH of blood is rapidly converted to glutamic acid and glycerin) by the esterases of the blood after absorption. By simple determination of the nitrogen content of the reaction product, the quantity of pyrrolidone carboxylate present is obtained. With this knowledge, accurate and precise dosage administration of the compound is easily achieved.

Furthermore, since the compound is administered as a solution, or as a liquid filled capsule, it is not necessary to isloate the final product since the material obtained is in a sufficient state of purity to be used for therapeutic purposes. If, for example, the glyceryl pyrrolidone carboxylate is utilized in the form of a glycerine solution at a concentration of active material of approximately 40 percent (exact concentration 41.71%) the solution has a bland to neutral taste and is without odor. The pH of this solution is approximately neutral (pH range, pH 6 to pH 8) and has a nitrogen concentration of 2.88 percent. The saponification value is approximately 115. This solution satisfactorily meets the test for the complete conversion of glutamic acid to pyrrolidone carboxylic acid by the absence of a formation of a gas, which is insoluble in alkaline potassium permanganate test solution, after the addition of acidified (acetic acid solution) sodium nitrite.

If it is desired to form the specific compound as, for example, the monopyrrolidone carboxylic glycerine ester, this may be achieved through the inter-reaction of the sodium (or potassium salt) of pyrrolidone carboxylic acid and glyceryl monochlorhydrin, in alcohol media. By the appropriate substitution of either the glyceryl dichlorhydrin or 1,2,3-trichloropropane, the respective dipyrrolidone carboxylic acid glyceryl ester and the tripyrrolidone carboxylic acid glyceryl ester may be obtained in substantially pure yield. There are no therapeutic differences observed during the utilization of either the mono, di or tripyrrolidone carboxylic glyceryl esters or a mixture of these since all are metabolized by the body, in a similar manner, and afford the same intermediates with the same therapeutic results.

Still another method of simultaneous dehydration and esterification procedures may be utilized to yield the same end products. For example, the use of an azeotropic distillation technique with benzine or toluene and a mixture of pyrrolidone carboxylic acid and glycerine may be employed to obtain the products of the present invention. This procedure is of special value when small laboratory size batches are desired since rigorous temperature control is not required.

The study of the minimum lethal dose of glyceryl pyrrolidone carboxylate by the method of Behrens and Karber utilizing young adult male rats (Wister strain) with an average weight of approximately 120 grams revealed the MLD to be in excess of 10 grams per kg. It was impossible to provoke any deaths in this series and there was no evidence of any intoxication or intolerance. The dosage of 10 grams per kg. was the largest dose which could be administered because of the limitations of the rats' stomach capacity.

The chronic daily dose of 10 grams per kg. for a ten day period, did not cause any toxic manifestations in the animals. Another study of ten rats (Wister strain) receiving a daily dose of 4 grams per kg. of the glycerine solution by gastric intubation for a period of 30 days, established that there was no evidence of chronic toxicity or loss of weight or any other abnormality which might be attributable to the drug. There were no deaths in this series. The only clinical observations relative to the administration to the drug were the more frequent stools as well as the softness thereof which resulted from the specific action of the quantities of glycerine ingested. At the end of the 30 day test period, all of the test animals were sacrificed and microscopic, as well as macroscopic examination of the organs revealed no tissue derangement or abnormalities. Thus, it is established that at a rather high test level ranging to the equivalence of approximately 700 grams per day for the average 70 kg. human adult, glyceryl pyrrolidone carboxylate appears to be without toxic reactions.

Ammonium ions are toxic to the nervous system and in the rat such intoxication is manifested by a state of intense excitation, terminating in convulsions and death, when the blood ammonium ion concentration reaches a level of 9 mg./100 grams of body weight (according to Richter and Dawson). The administration of glyceryl pyrrolidone carboxylate protected the rat against the ammonium ion intoxication resulting after subcutaneous injection of ammonium chloride, corresponding to a concentration of 17.5 mg. per 100 grams of body weight while the control, untreated animals receiving the same quantities of ammonium ion showed intense nervous crisis. The pretreated group remained perfectly calm and even appeared to be slightly lethargic. In this fashion, the existence of adequate blood serum levels of glutamic acid following administration of the subject compounds are established.

The potassium ion, in subtoxic doses, is also known to provoke intense, nervous excitation in test animals. Two groups of animals were studied. One group was fed (by gastric intubing) 0.42 grams per 100 grams of body weight daily of glyceryl pyrrolidone carboxylate for one week while the others, serving as controls, were untreated. After one week of pretreatment, and one hour following the last feeding of glyceryl pyrrolidone carboxylate, both groups of animals received, by subcutaneous injection, a dose of potassium maleate (20% solution) equivalent to 56 mg./100 gr. of body weight of potassium ion. Within one minute following the injection of the potassium ion, the control animals developed strong tremors followed by nervous crisis with intense agitation and wildly uncoordinated movements. The treated animals showed none of these phenomena and remained calm and almost immobile. Again, the results establish the existence of sufficiently high blood serum levels after administration of the subject compounds.

Glyceryl pyrrolidone carboxylate was tested for its hepatic antitoxic effects as demonstrated by the elimination of brom-sulfo phthalein. After the administration of a hepatic toxin, such as alcohol, a slower rate of elimination is observed. The beneficial effect afforded to the liver by treatment with the compounds of our invention was established by a much more rapid elimination of brom-sulfo phthalein by animals whose liver was protected by the subject compounds as contrasted to those who were not so protected. It is especially noted that the animals which have liver damage eliminate brom-sulfo phthalein more slowly than those whose liver had been protected by the subject compounds and consequently have no hepatic toxicity.

Research has demonstrated that glyceryl pyrrolidone carboxylate is a "normalizing," non-hypnotic tranquilizer. Through its use, calm is restored to agitated and anxious children permitting normalized physiologic sleep. Simultaneously, the personality and work capacity of this group is improved. Students who are exhausted by intense study during a pre-examination period are restored to normal nervous equilibrium by glyceryl pyrrolidone carboxylate and adults formerly dependent on hypnotics for sleep find that these agents may be discontinued when under treatment with glyceryl pyrrolidone carboxylate.

The following examples which are illustrative but manifestly not exhaustive expand the material above presented.

*Example I*

In a round bottom glass flask, fitted with a reflex condenser, a stirrer and an inlet tube for gaseous carbon dioxide, are placed 3 moles of anhydrous glycerine. A steady flow of carbon dioxide is started through the glycerine, the heating is begun and one mole of dry, glutamic acid is added rapidly. The mixture is stirred, while the temperature is raised to at least 150° C. and preferably between 150° C. and 160° C. The inert atmosphere of carbon dioxide is maintained throughout the entire reaction period. The course of the reaction is followed by periodic determinations of pH of the mixture, utilizing the conventional glass-electrode technique. When the pH of the mixture is approximately neutral (between pH 6 and pH 8) the heating is stopped and the reaction mixture is allowed to cool to room temperature under an inert carbon dioxide atmosphere. The reaction time is ordinarily between 8 and 6 hours, although this may be shortened or lengthened dependent upon the temperature used.

The resultant material is substantially the glycerol mono-ester of pyrrolidone carboxylic acid, although there may be small amounts of the di and tri-glyceride esters present. The nitrogen concentration is determined by the Kjeldahl technique, which confirms the quantity of pyrrolidone carboxylic acid present. The structural formula of glyceryl monopyrrolidone carboxylate is

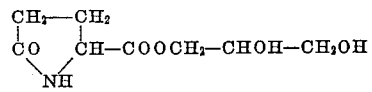

The compound is a viscous, clear liquid.

When the glycerine solution of pyrrolidone carboxylic acid glyceryl ester is treated with sodium nitrite in acetic medium, it does not cause the evolution of a gas which is insoluble in alkaline potassium permanganate solution. This confirms the complete dehydration of glutamic acid. The saponification value of the glyceryl ester of pyrrolidone carboxylic acid in glycerine solution, is approximately 115. The solution of the compound has a pH which is approximately neutral (between pH 6 and pH 8) and the nitrogen concentration is 2.88 percent.

Since the reaction involves only one mole of glycerine and one mole of glutamic acid the excess glycerine serves as an inherent solvent for the glyceryl ester of pyrrolidone carboxylic acid and the mixture may be used in clinical therapy without further dilution or adjustment. The product is sufficiently pure, as demonstrated by the toxicity testing for safe administration to humans and animals. A dosage range of from 1–4 teaspoonfuls, 3 to 6 times daily, dependent upon the age and the needs of the patient will be found satisfactory for the great majority of the patient population requiring this medication. It is recognized however that some individuals may require lesser amounts and others greater amounts than the described range. Of course it is not necessary to use an excess of glycerine as above described, and similarly the excess may be less than the molar ratio of 3 to 1.

*Example II*

To the round bottom flask, fitted with a reflux condenser and a stirrer is added two moles of glyceryl monochlorhydrin dissolved in 250 ml. of anhydrous isopropyl alcohol and two moles of the sodium salt of pyrrolidone carboxylic acid in 250 ml. of anhydrous isopropyl alcohol. As the mixture is stirred and heated to reflux temperature, there is a precipitation of sodium chloride. After approximately 4 hours of refluxing, the reaction is essentially complete, and the mixture is allowed to cool to room temperature, while the stirring is maintained. The precipitated sodium chloride is separated by rapid filtration and the isopropyl alcohol evaporated under reduced pressure to yield the pure glyceryl mon-ester of pyrrolidone carboxylic acid. This compound is a viscous clear liquid which contains 6.89 percent of nitrogen. It is soluble in water and ethanol and may be used in therapy without further dilution.

Example III

The glyceryl di-pyrrolidone carboxylic ester is obtained by substituting glyceryl di-chlorhydrin for the glyceryl monochlorhydrin in stoichiometric equivalent amounts, and increasing the concentration of the sodium salt of the pyrrolidone carboxylic acid to four molar proportions in place of the molar quantity used in Example II. The remainder of the procedure as described above in Example II is followed exactly. The glyceryl ester of the dipyrrolidone carboxylic acid contains 9.26 percent of nitrogen and is soluble in water and alcohol.

Example IV

The glyceryl ester of tri-pyrrolidone carboxylic acid is obtained through a similar method as described in Example II but substituting in place of the glyceryl monochlorohydrin 1, 2, 3 tri-chloropropane in stoichiometric equivalent amounts and reacting this substance with 3 molar parts of sodium pyrrolidone carboxylate. The triglyceride is obtained in a substantially pure yield and contains 9.89% of nitrogen.

Example V

To one mole of pyrrolidone carboxylic acid contained in a round bottom boiling flask, fitted with a reflux condenser and a moisture trap, is placed 3 moles of glycerine and 300 ml. of anhydrous benzine or toluene. The mixture is heated to reflux temperature, which is maintained until the calculated quantity of water is removed. The reaction is then stopped and the benzine or toluene distilled under reduced pressure. The resultant mixture consists of an approximately 40% solution of the glycerol monoester pyrrolidone carboxylic acid and may be used without further purification or adjustment, for therapy. The nitrogen value is determined in order to ascertain proper dosage range. Of course other anhydrous organic solvents may be employed instead of the benzine and toluene.

Example VI

In place of the sodium salt of pyrrolidone carboxylic acid of Examples II, III, and IV there may be substituted any alkali metal salt of pyrrolidone carboxylic acid in equivalent stoichiometric proportions, all other conditions remaining substantially the same.

Example VII

In place of the glyceryl monochlorhydrin of Example II the glyceryl di-chlorhydrin of Example III and the tri-chloropropane of Example IV, there may be substituted the analogous halogen propane derivative in stoichiometric equivalent proportions, all else remaining substantially the same. Obviously, the members of the halogen family other than the fluoro compound will give better yields and the chloro is preferred because of its ready availability and its low price.

It will be noted that any of the propanes which are tri-substituted by hydroxy or the halogen members or combinations of the same may be employed as one class of starting materials and that one of pyrrolidone carboxylic acid and its alkali metal salts may be used on the other hand to obtain the desired compound. Again, almost any anhydrous alcohol can be employed to facilitate the reaction, but if alcohols lower than the propyls are used then there will be greater difficulty in isolating the subject compounds but such difficulties of course may be surmounted by conventional means.

Example VIII

When it is desired to protect a patient against either ammonium ion or potassium ion intoxication, the glyceryl ester of pyrrolidone carboxylic acid may be administered to the patient in a dosage range of from one to four teaspoonsful, three to six times daily. Therapeutically equivalent proportions of the di- or tri-pyrrolidone carboxylic acid ester of glycerine may also be utilized for these purposes.

If the oral route of administration is not feasible, the glyceryl ester of pyrrolidone carboxylic acid may be administered by the intravenous route through the slow continuous drip method. A dosage range of from ten to thirty grams per day may be safely administered to produce the desired results. For this purpose, the glycerine solution may be diluted with saline solution or dextrose solution; the exact methods for preparing such an intravenous drip solution are well known to those acquainted with the technique of this method of drug administration.

Example IX

When it is desired to protect the liver against hepatotoxins, such as alcohol, as would be the case in the presence of cirrhosis of the liver, the glycerol ester of pyrrolidone carboxylic acid may be administered in a dosage range of from one to four teaspoonful, three to six times daily, depending upon the individual patients needs. In this instance as well, the di- and tri-pyrrolidone carboxylic esters of glycerine may be utilized in therapeutically equivalent proportions. The compounds may be administered either orally as a glycerine solution or in the form of a parenteral drip solution.

Example X

The glyceryl esters of pyrrolidone carboxylic acid may be utilized as an agent to augment mental functioning and to generally improve the mood and attitude of the patient. For this purpose, a dosage range of from one to four teaspoonsful three to six times daily, of a glycerine solution of the above compounds are administered. The effects observed may range from the improved psychomotor activity commonly associated with the broad class of drugs known as "psychic-energizers" or may extend to a tranquilization as resulting after the administration of a member of the class of drugs known as "tranquilizers." The particular patients' response will depend upon the underlying nervous system disorder for which the patients are being treated and the particular symptomatic aspects the disease manifestation exhibits.

This application is a continuation-in-part of copending application Serial No. 733,264 entitled "Method of Manufacture of Pyrrolidone Carboxylate of Glycerine or Glyceric Ester of Dehydrated Glutamic Acid," filed May 6, 1958, now abandoned.

Although the present invention has been described with a certain degree of particularity, it is understood that the present disclosure has been made only by way of example and that numerous variations may be employed without transcending the scope of the invention as hereinafter claimed.

What is claimed is:

1. A compound selected from the group consisting of glyceryl monopyrrolidone carboxylate, glyceryl dipyrrolidone carboxylate, and glyceryl tripyrrolidone carboxylate.
2. Glyceryl monopyrrolidone carboxylate.
3. Glyceryl dipyrrolidone carboxylate.
4. Glyceryl tripyrrolidone carboxylate.

(References on following page)

References Cited in the file of this patent

UNITED STATES PATENTS

| | | |
|---|---|---|
| 2,112,329 | Braun | Mar. 29, 1938 |
| 2,537,988 | Sanford et al. | Jan. 16, 1951 |
| 2,542,481 | Crandall et al. | Feb. 20, 1951 |
| 2,772,287 | Cusic | Nov. 27, 1956 |
| 2,772,288 | Cusic | Nov. 27, 1956 |
| 2,790,000 | Norman et al. | Apr. 23, 1957 |
| 2,854,379 | Fancher | Sept. 30, 1958 |
| 2,872,374 | Morton et al. | Feb. 3, 1959 |